US008201088B2

(12) United States Patent
Levantovsky et al.

(10) Patent No.: US 8,201,088 B2
(45) Date of Patent: Jun. 12, 2012

(54) METHOD AND APPARATUS FOR ASSOCIATING WITH AN ELECTRONIC DOCUMENT A FONT SUBSET CONTAINING SELECT CHARACTER FORMS WHICH ARE DIFFERENT DEPENDING ON LOCATION

(75) Inventors: Vladimir Levantovsky, North Andover, MA (US); Richard G. Comeau, Bedford, MA (US); Christopher J. Chapman, Framingham, MA (US)

(73) Assignee: Monotype Imaging Inc., Woburn, MA (US)

( * ) Notice: Subject to any disclaimer, the term of this patent is extended or adjusted under 35 U.S.C. 154(b) by 116 days.

(21) Appl. No.: 11/491,904

(22) Filed: Jul. 25, 2006

(65) Prior Publication Data

US 2008/0028304 A1 Jan. 31, 2008

(51) Int. Cl.
*G06F 17/00* (2006.01)
*G06T 11/00* (2006.01)

(52) U.S. Cl. ......... 715/269; 715/202; 715/256; 345/471

(58) Field of Classification Search .......... 715/200, 715/204, 205, 256, 269, 201, 207, 234, 238, 715/249, 254, 255, 265, 273, 202, 209, 226, 715/231, 244, 746, 800; 345/471, 472, 472.1, 345/472.2, 670, 671, 676; 709/231
See application file for complete search history.

(56) References Cited

U.S. PATENT DOCUMENTS

| | | | |
|---|---|---|---|
| 4,244,657 A * | 1/1981 | Wasylyk | 400/109 |
| 5,347,266 A | 9/1994 | Bauman et al. | |
| 5,412,771 A * | 5/1995 | Fenwick | 345/468 |
| 5,416,898 A | 5/1995 | Opstad et al. | |
| 5,526,477 A * | 6/1996 | McConnell et al. | 345/467 |
| 5,528,742 A | 6/1996 | Moore et al. | |
| 5,586,242 A * | 12/1996 | McQueen et al. | 345/467 |
| 5,737,599 A | 4/1998 | Rowe et al. | |
| 5,781,714 A | 7/1998 | Collins et al. | |
| 5,877,776 A | 3/1999 | Beaman et al. | |
| 5,940,581 A | 8/1999 | Lipton | |
| 6,031,549 A * | 2/2000 | Hayes-Roth | 345/474 |
| 6,065,008 A | 5/2000 | Simon et al. | |
| 6,141,002 A * | 10/2000 | Kanungo et al. | 715/716 |

(Continued)

FOREIGN PATENT DOCUMENTS

WO    WO 94/23379 A  *  10/1994

(Continued)

OTHER PUBLICATIONS

TrueType fundamentals, Microsoft Typography, Nov. 1997, pp. 1-17.*

(Continued)

*Primary Examiner* — Maikhanh Nguyen
(74) *Attorney, Agent, or Firm* — Fish & Richardson P.C.

(57) ABSTRACT

A method and apparatus are provided for embedding a font subset in an electronic document. The method in one form includes analyzing a document having characters of a font set where characters may have different forms depending on the location of the character in a word or one or more ligatures represent a combination of characters. A font subset is created corresponding to only the character forms present in the document and the font subset is associated with the document. Advantageously, the embedded font subset only contains the font characters which are used in the document and not all characters which may be present in a complete font set for all font sets referenced in the document.

10 Claims, 2 Drawing Sheets

U.S. PATENT DOCUMENTS

| | | | | |
|---|---|---|---|---|
| 6,249,908 B1* | 6/2001 | Stamm | | 717/113 |
| 6,252,671 B1* | 6/2001 | Peng et al. | | 358/1.11 |
| 6,313,920 B1* | 11/2001 | Dresevic et al. | | 358/1.11 |
| 6,490,051 B1* | 12/2002 | Nguyen et al. | | 358/1.15 |
| 6,522,330 B2 | 2/2003 | Kobayashi | | |
| 6,583,789 B1 | 6/2003 | Carlson et al. | | |
| 6,675,358 B1 | 1/2004 | Kido | | |
| 6,678,688 B1 | 1/2004 | Unruh | | |
| 6,704,116 B1* | 3/2004 | Abulhab | | 358/1.11 |
| 6,718,519 B1* | 4/2004 | Taieb | | 715/269 |
| 6,754,875 B1* | 6/2004 | Paradies | | 715/262 |
| 6,760,029 B1* | 7/2004 | Phinney et al. | | 345/471 |
| 6,771,267 B1* | 8/2004 | Muller | | 345/467 |
| 6,810,504 B2 | 10/2004 | Cooper et al. | | |
| 6,813,747 B1* | 11/2004 | Taieb | | 715/269 |
| 6,856,317 B2 | 2/2005 | Konsella et al. | | |
| 6,901,427 B2* | 5/2005 | Teshima | | 709/203 |
| 6,952,210 B1* | 10/2005 | Renner et al. | | 345/471 |
| 7,064,757 B1* | 6/2006 | Opstad et al. | | 345/467 |
| 7,155,672 B1* | 12/2006 | Adler et al. | | 715/210 |
| 7,184,046 B1* | 2/2007 | Hawkins | | 345/467 |
| 7,188,313 B2* | 3/2007 | Hughes et al. | | 715/263 |
| 7,228,501 B2* | 6/2007 | Brown et al. | | 715/234 |
| 7,492,365 B2* | 2/2009 | Corbin et al. | | 345/468 |
| 7,505,040 B2* | 3/2009 | Stamm et al. | | 345/467 |
| 7,636,885 B2* | 12/2009 | Merz et al. | | 715/256 |
| 7,882,432 B2* | 2/2011 | Nishikawa et al. | | 715/269 |
| 2002/0087702 A1* | 7/2002 | Mori | | 709/228 |
| 2002/0093506 A1* | 7/2002 | Hobson | | 345/553 |
| 2004/0025118 A1* | 2/2004 | Renner | | 715/542 |
| 2004/0088657 A1 | 5/2004 | Brown et al. | | |
| 2004/0119714 A1 | 6/2004 | Everett et al. | | |
| 2004/0207627 A1 | 10/2004 | Konsella et al. | | |
| 2005/0275656 A1* | 12/2005 | Corbin et al. | | 345/467 |
| 2006/0017731 A1* | 1/2006 | Matskewich et al. | | 345/467 |
| 2006/0072137 A1 | 4/2006 | Nishikawa et al. | | |
| 2006/0285138 A1* | 12/2006 | Merz et al. | | 358/1.11 |
| 2007/0139413 A1* | 6/2007 | Stamm et al. | | 345/467 |
| 2007/0159646 A1* | 7/2007 | Adelberg et al. | | 358/1.11 |

FOREIGN PATENT DOCUMENTS

| | | | |
|---|---|---|---|
| WO | WO 01/91088 A1 * | 11/2001 | |
| WO | WO 2004/012099 A1 * | 2/2004 | |
| WO | WO 2005/001675 | 1/2005 | |

OTHER PUBLICATIONS

"To Unicode Mapping File Tutorial," Adobe Technical Note, XP002348387, May 2003.*

Adobe Systems Incorporated, "PostScript Language Reference," Addison-Wesley Publishing Company, Third Edition, Chapter 5, pp. 313-390, Feb. 1999.*

Adobe Systems Incorporated, "The Type 42 Font Format Specification," Technical Note #5012, pp. 1-24, Jul. 31, 1998.*

Apple Computers, "The TrueType Font File," pp. 1-7, Oct. 27, 2000.*

Celik et al., "W3C, CSS3 Module: Fonts," W3C Working Draft Jul. 31, 2001, pp. 1-30.*

"PostScript Language Reference—Third Edition", Adobe Systems Incorporated, Feb. 1999, pp. 313-390.*

Supplementary European Search Report, European Patent Office, European patent application No. EP 07796924, dated Dec. 27, 2010, 8 pages.

* cited by examiner

METHOD AND APPARATUS FOR ASSOCIATING WITH AN ELECTRONIC DOCUMENT A FONT SUBSET CONTAINING SELECT CHARACTER FORMS WHICH ARE DIFFERENT DEPENDING ON LOCATION

FIELD OF THE INVENTION

The present invention relates to font subsetting and, in particular, a method and apparatus for font subsetting based on analysis of a document in which font subsets are based on the characters present in the document, their positional variants and contextual substitutions.

BACKGROUND OF THE INVENTION

The appearance and layout of a typical text document, e.g. a word processing document, or a media presentation document, is determined by the selection of fonts used to display the characters which comprise the text document. Although a document can be rendered using native fonts, i.e. fonts stored on an end user's computer, in order to ensure faithful rendering on any computer system, such as a computer system where the fonts used in a document may not be available, the fonts have to be embedded in the document itself. For example, font sets can be stored either on a computer system as part of the computer's operating system, such as Microsoft Windows® or Macintosh®, and/or font sets can be embedded within a text document and/or transmitted with the multimedia content for playback on a remote computer or mobile device. Although embedding a text document with a font set used in the document would allow the document to be faithfully rendered on any computer system regardless of what fonts are stored on the computer system, the font embedding increases the size of the document which, consequently, leads to a document which requires more memory to store and more bandwidth to be transmitted electronically.

One previous method to reduce the size of an electronic document with embedded fonts is to subset a font in the document. Prior subsetting methods selectively store glyphs that represent the characters or character sets (e.g., all Latin characters) used in a document. Each character represents a unit of text content, while a glyph is a unit of text display that determines the appearance of a character—a specific symbol representing a semantic or phonic unit of definitive value in the writing system. In a font, a glyph refers to any symbol representing a character, whether it be a letter, number or punctuation mark. In digital fonts there may be multiple versions of different glyphs representing the same characters.

For many languages, there is a simple one-to-one character to glyph mapping and the process of font subsetting is straightforward and easy to implement. However, for many complex language scripts, such as Arabic and Indic where the appearance of a character depends on its position in a word and/or adjacent characters, font subsetting is complex. For example, fonts that support complex language scripts may contain multiple different glyphs mapped to the same character code, i.e. the Unicode or hexadecimal code which corresponds to the character in the font set. These glyphs usually represent different forms of a character, such as when the character is isolated or by itself, as the initial character of a word, in a medial position of the word, or in a final position of the word.

In addition, some language scripts have glyphs that represent different ligatures. For example, the combination of characters may create ligatures, which are defined as two or more letter forms written or printed as a unit, such as "fi" becomes "fi" and "fl" becomes "fl." As a result, a single character or ligature may represent a combination of characters present in the document. In some scripts (such as Latin), the use of ligatures is optional, while in other language scripts, ligature support is mandatory.

The prior subsetting methods accommodate all possible glyph forms of a character by storing all of the glyph forms for a particular character, regardless of whether the glyph forms are actually used in the document. Consequently, the prior processes are inefficient and require storing a significant number of glyph variants that are never used in the document.

One disadvantage with prior font subsetting methods is that such methods are not well suited for font sets and/or complex language scripts which have multiple glyphs which represent a single character, or single glyphs which represent ligatures—the combinations of characters present in a document. In an effort to ensure that all combinations of glyphs corresponding to each character are available, the prior subsetting methods typically include glyphs which are not used in the document and, therefore, result in a document with embedded fonts that is unnecessarily larger in size. The larger document size requires more memory to store the document and precious bandwidth to transmit the document.

There is a need in the art for an improved font subsetting method which more effectively and efficiently embeds fonts used in a document.

SUMMARY OF THE INVENTION

The present invention concerns a method and an apparatus for font subsetting having a language script processor which preprocesses a document's text and analyzes all character combinations for generating a font subset which includes only glyph variants for font characters used in that document. As a result, the present method and apparatus allows for the reduction in size of font subsets and a reduction in storage size of electronic documents and data transmission bandwidth for media presentations of documents with the embedded font subset(s). For example, the present method and apparatus may be used with documents written in languages which have complex language scripts, such as Arabic and Indic, where the appearance of a character depends on its position in a word and/or adjacent characters.

The present invention, in one form thereof, relates to a method for font subsetting which comprises analyzing a document comprising characters and a font set which characters have different forms depending on the location of the character in a word or whether ligatures represent a combination of characters. A subset of the font set is created which corresponds to only the character forms present in the document, determined after analyzing the document. The subset of the font set is associated with the document. In one further form, associating the subset of font set comprises storing or embedding the subset within the document.

The present invention in another form thereof, concerns a method for font subsetting, comprising analyzing a document comprising characters which have glyph forms corresponding to: 1) the location in which a character is located within a word, and/or 2) a combination of characters. A font character subset is created in which the subset comprises only the glyph forms present in the document as determined from analyzing the document. The font character subset is then embedded in the document, or associated with the electronic document or multimedia presentation.

The present invention in another form thereof concerns a computer-readable medium containing program instruction for font subsetting. The instructions comprise analyzing a document containing characters set using a particular font set, including characters having different forms depending on the location of the character in a word or comprising one or more ligatures represent a combination of characters; creating a font subset corresponding to only character and glyph forms present in the document determined in the analyzing of the document; and associating the font subset with the document.

The present invention in another form thereof, concerns a computer system for font subsetting. The system comprises memory for storing a document containing characters having glyph forms corresponding to a) the location in which a character is located within a word and/or b) a combination of characters. The system further comprises a processor for analyzing the document to determine which glyphs are utilized therein; creating a subset of the font set corresponding to only the character and glyph forms present in the document determined in the analyzing of the document; and associating the subset of the font set with the document.

DETAILED DESCRIPTION

Figure 1:
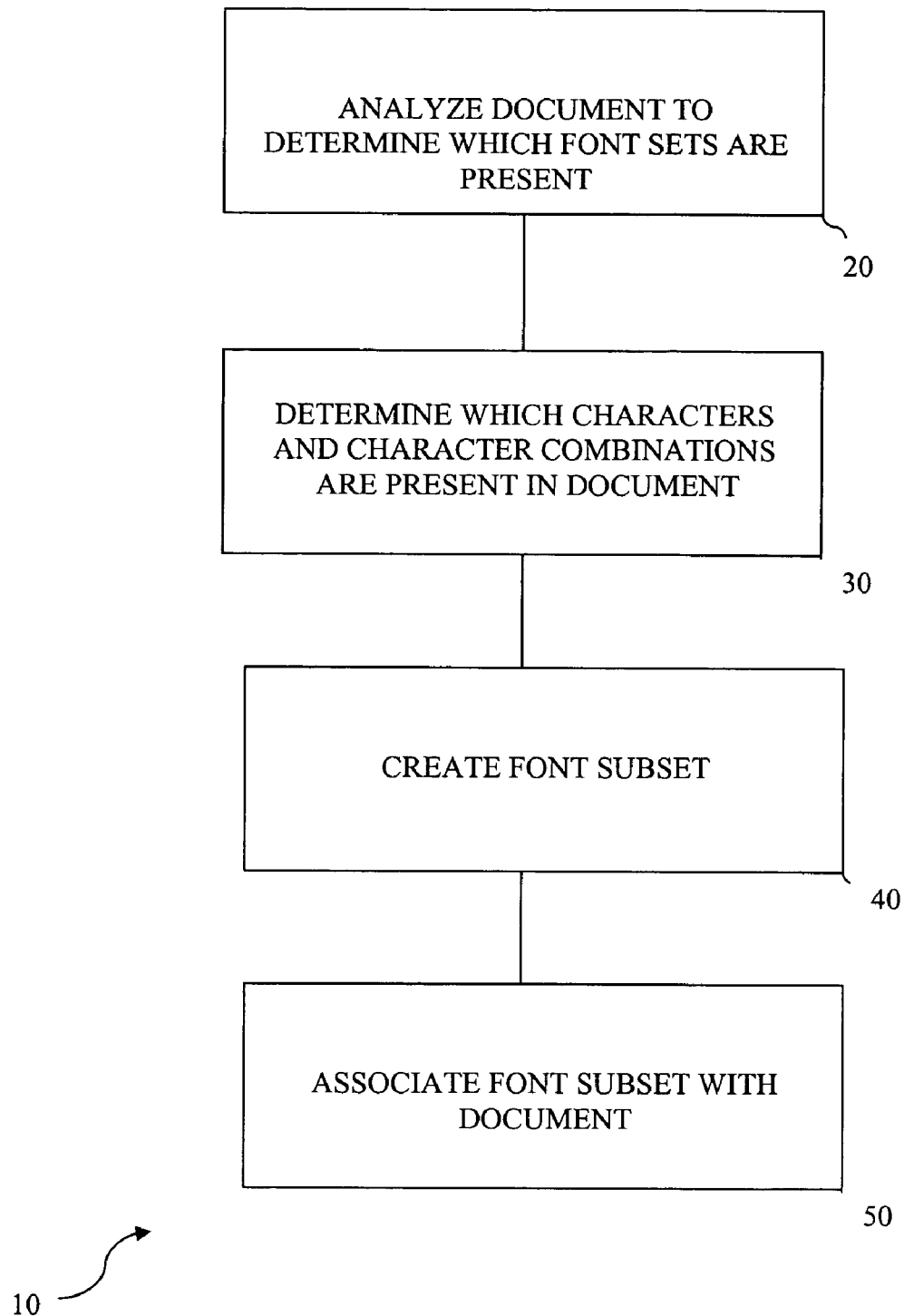
FIG. 1 is a flow chart of one method in accordance with the present invention.

Referring now to the figures and, in particular, FIG. 1, method 10 comprises analyzing text documents composed of characters of one or more font sets (step 20). The document is examined to determine which font sets are used to render the characters in the text document (step 20).

Next, the characters in the documents are analyzed to determine which characters and character combinations are present and to determine which, if any, glyph variants of the font set are used within the document, and/or whether one or more combination of characters is represented by a single ligature in the font character set used to render the text in the document (step 30). For example, the document may use a font character set in which characters are represented by different glyphs, where a different glyph is used depending on whether the character is the initial, middle or final character in a word, as in Arabic and Indic character sets. Further, the font character set may include ligatures, which represent a combination of characters, such as "fi" which is represented by ligature "fi" and "fl" which is represented by ligature "fl." Therefore, if the document includes one or more ligatures, it will be determined that such a ligature is to be included in a font subset to be associated with the document (step 30).

A font subset is created which contains all of the character forms present in the document based on the analysis of the document, which includes all glyphs and ligatures present in the document (step 40). The font subset does not contain extraneous or unused glyphs or ligatures which may be present in a complete font set but are not used within the document analyzed. For example, should the font set include a character having a glyph form corresponding to when the character is present at the initial position of a word, and the document does not contain a word in which the character is in the initial position of a word, then the font subset created will not include that glyph form.

At step 50, the font subset is associated with the document as an embedded font set.

Figure 2:
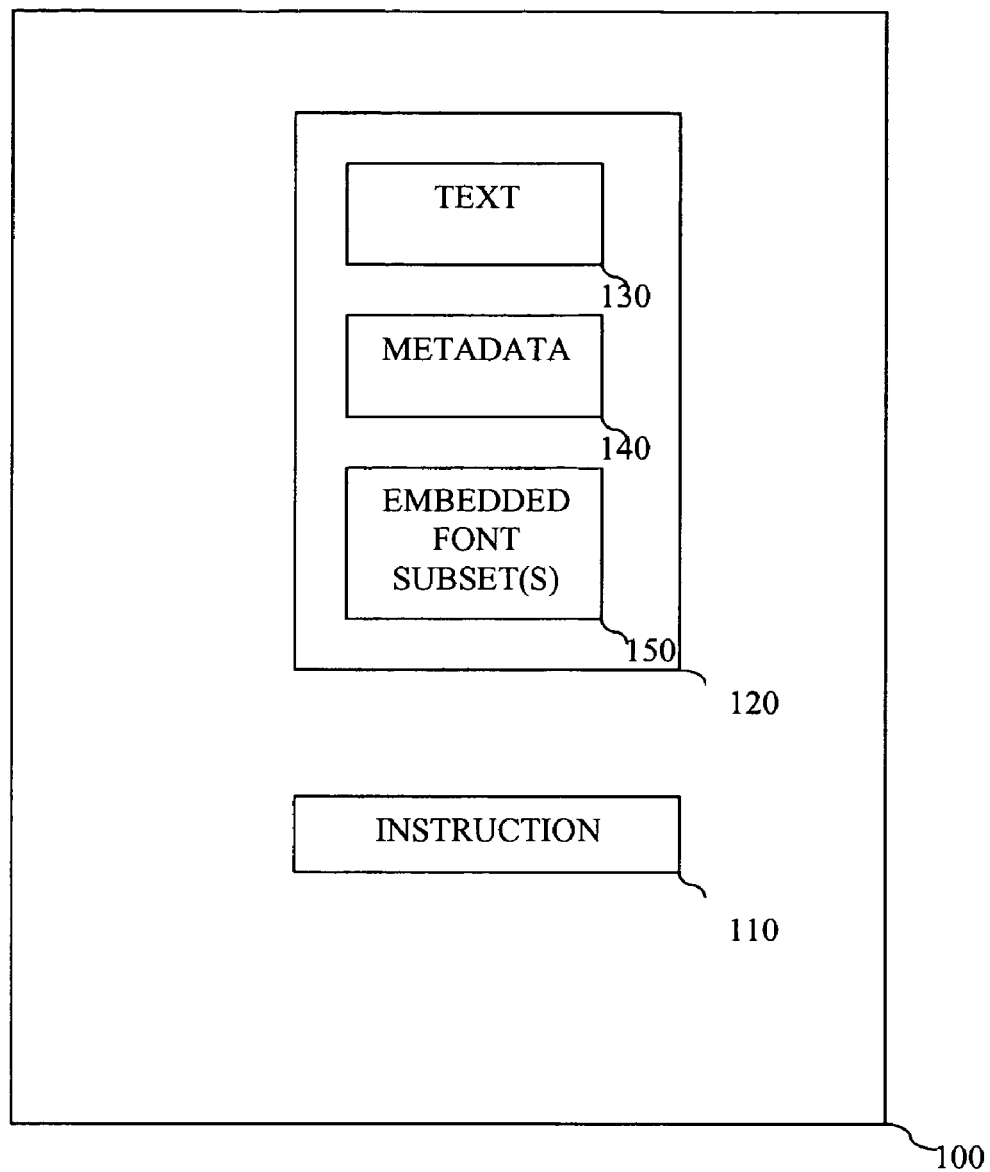
FIG. 2 is a schematic depicting implementation in accordance with one aspect of the present invention.

Referring now to FIG. 2 along with FIG. 1, the present font subsetting method can be implemented in the form of a computer program initially stored on an appropriate computer medium 100 in the form of computer instruction 110 which can be executed by a computer processor (not shown). Document 120 contains text 130 which is composed of characters of a font set. The document also includes metadata 140 which corresponds to document formatting and other information regarding the document. After the document 120 has been analyzed (step 20), which includes text 130 and metadata 140, and all character forms present in the text 130 have been determined (step 30), embedded fonts 150 are associated with the document 120 (step 50). The embedded fonts 150 contain only the character forms present in the text 130 which includes only the glyphs and ligatures of the text, but no additional character forms which may be present in the font set used to render the text of document 120.

It will now be apparent to one of ordinary skill in the art that the present method provides features and advantages not found in prior font embedding methods. For example, the embedded fonts associated with text documents only include those characters present in the text of the document and not all characters which are present in the font set used in the document text. As a result, the embedded font subset will have a reduced size as compared with prior embedded fonts created using the prior art method of font subsetting, as the prior embedded font subsets include all character forms or glyphs for all characters of a document, regardless of whether a particular glyph form is actually used in the text of the document. Consequently, a document with embedded fonts, in accordance with the present invention, will have a reduced size, requiring less storage space for the electronic document and requiring a reduced data transmission bandwidth when being sent as an electronic document.

Although the invention has been described above in relation to preferred embodiments thereof, it will be understood by those skilled in the art that variations and modifications can be effected in these preferred embodiments without departing from the scope and spirit of the invention.

The invention claimed is:

1. A computer-implemented method for font subsetting, wherein a computer is programmed to perform steps of the method and said method comprises:

analyzing, by a processor, for each of all multiple text fonts represented in a document, characters of a font set of the text of the document character by character and by character combinations to identify interdependence between the characters and determine the characters associated with glyphs having different forms at different locations of a character in a word or the font set where one or more ligatures represent a combination of characters, wherein analyzing includes determining if characters of one of the multiple text fonts include variants of a glyph and if characters of one of the multiple text fonts include a combination of characters that represent a single ligature;

creating a font subset containing shapes of the glyphs corresponding to only character forms present in the document identified in the analyzing of the text of the document thereby providing a font subset of a reduced size, wherein the font subset includes a ligature or a glyph that has different forms at different locations of a character in a word; and associating the font subset with the document, wherein said associating the font subset with the document comprises embedding the font subset in the document or transmitting the font subset along with the document.

2. The method of claim 1, wherein said associating the font subset comprises storing the font subset within the document.

3. The method of claim 1, wherein one or more of said characters have different positional glyph variants depending on the characters thereto and whether the character is an isolated, an initial, a medial or a final character of a word.

4. The method of claim 1, wherein the combination of characters in the font set is represented by the single ligature in the font subset.

5. A computer-implemented method for font sub setting, wherein a computer is programmed to perform steps of the method and said method comprises:

analyzing, by a processor, for each of all multiple text fonts represented in a document, characters in the text of the document character by character and by character combinations to identify interdependence between the characters and determine the characters which have glyph forms corresponding to:
1) a location in which a character is located within a word or
2) a combination of character,
wherein analyzing includes determining if characters of one of the multiple text fonts include variants of a glyph and if characters of one of the multiple text fonts include a combination of characters that represent a single ligature;
creating a font character subset comprising only the glyph forms present in the document as identified from the analyzing of the text of the document thereby providing a font subset of a reduced size, wherein the font subset includes a ligature or a glyph that has different forms at different locations of a character in a word; and
associating the font character subset with the document, wherein said associating the font character subset with the document comprises embedding the font character subset in the document or transmitting the font subset along with the document.

6. The method of claim 5, wherein one or more of said characters have different glyph forms depending on the characters adjacent thereto and whether the character is an isolated, an initial, a medial or a final character of a word.

7. The method of claim 6, wherein the combination of characters is represented by the single ligature in the font character subset.

8. A non-transitory computer-readable medium comprising instructions for font subsetting, said instructions when executed by a processor perform a method comprising:

analyzing, for each of all multiple text fonts represented in a document, the text of the document comprising characters of a font set character by character and by character combinations to identify interdependence between the characters, wherein said characters comprise different forms at different locations of a character in a word or one or more ligatures which represent a combination of characters, wherein analyzing includes determining if characters of one of the multiple text fonts include variants of a glyph and if characters of one of the multiple text fonts include a combination of characters that represent a single ligature;
creating a font subset corresponding to only character forms present in the document identified in the analyzing of the text of the document to thereby provide a font subset of a reduced size, wherein the font subset includes a ligature or a glyph that has different forms at different locations of a character in a word; and associating the font subset with the document,
wherein said associating the font subset with the document comprises embedding the font subset in the document or transmitting the font subset along with the document.

9. The computer processor of claim 8, wherein the font subset is transmitted as a separate data stream in a media presentation.

10. A computer system for font subsetting, said system comprising:

computer memory for storage and recall of text of a document comprising characters having glyph forms corresponding to:
a) a location in which a character is present within a word or
b) a combination of characters;
a processor for:
i) analyzing, for each of all multiple text fonts represented in the document, the text of the document character by character and by character combinations to identify interdependence between the characters and determine which glyphs are present therein, wherein analyzing includes determining if characters of one of the multiple text fonts include variants of a glyph and if characters of one of the multiple text fonts include a combination of characters that represent a single ligature;
ii) creating a subset of a font set corresponding to only character forms present in the text identified in the analyzing of the text of the document to thereby provide a font subset of a reduced size, wherein the font subset includes a ligature or a glyph that has different forms at different locations of a character in a word; and
iii) associating the subset of the font set with the document, wherein said associating the subset of the font set with the document comprises embedding the subset of the font set in the document or transmitting the font subset along with the document.

* * * * *

UNITED STATES PATENT AND TRADEMARK OFFICE
CERTIFICATE OF CORRECTION

| | | |
|---|---|---|
| PATENT NO. | : 8,201,088 B2 | Page 1 of 1 |
| APPLICATION NO. | : 11/491904 | |
| DATED | : June 12, 2012 | |
| INVENTOR(S) | : Vladimir Levantovsky, Richard G. Comeau and Christopher J. Chapman | |

It is certified that error appears in the above-identified patent and that said Letters Patent is hereby corrected as shown below:

Column 5, Line 6, In Claim 4, delete "the" and insert -- a --

Column 5, Line 8, In Claim 5, delete "sub setting," and insert -- subsetting, --

Column 5, Line 20, delete "character," and insert -- characters, --

Column 5, Line 42, In Claim 7, delete "the" and insert -- a -- (1st occurrence)

Signed and Sealed this
Seventh Day of August, 2012

David J. Kappos
*Director of the United States Patent and Trademark Office*